United States Patent
Mazaira et al.

(10) Patent No.: US 10,155,499 B1
(45) Date of Patent: Dec. 18, 2018

(54) METHODS AND APPARATUS TO FACILITATE VEHICLE LOCKING

(71) Applicant: Ford Global Technologies, LLC, Dearborn, MI (US)

(72) Inventors: Jordan Mazaira, Taylor, MI (US); Brandon Evans Armstrong, Hazel Park, MI (US); Michael David Beeney, Canton, MI (US); George Hart Vrampas, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/894,689

(22) Filed: Feb. 12, 2018

(51) Int. Cl.
| | |
|---|---|
| *B60R 25/04* | (2013.01) |
| *B60R 25/25* | (2013.01) |
| *B60R 25/045* | (2013.01) |
| *B60R 25/10* | (2013.01) |
| *B60R 25/23* | (2013.01) |
| *B60R 25/104* | (2013.01) |

(52) U.S. Cl.
CPC ............ *B60R 25/04* (2013.01); *B60R 25/045* (2013.01); *B60R 25/10* (2013.01); *B60R 25/252* (2013.01); *B60R 25/255* (2013.01); *B60R 25/257* (2013.01); *B60R 25/104* (2013.01); *B60R 25/23* (2013.01)

(58) Field of Classification Search
CPC ..... B60R 25/04; B60R 25/252; B60R 25/255; B60R 25/257; B60R 25/045; B60R 25/10; B60R 25/23; B60R 25/104; G07C 9/00563; G07C 9/0069
USPC ...................................... 340/5.52, 5.53, 5.6
See application file for complete search history.

(56) References Cited

U.S. PATENT DOCUMENTS

| | | | |
|---|---|---|---|
| 4,446,380 A | 5/1984 | Moriya et al. | |
| 7,394,352 B2 * | 7/2008 | Bell | B60R 25/04 |
| | | | 180/287 |
| 8,487,753 B1 | 7/2013 | Watts | |
| 8,616,611 B2 * | 12/2013 | Schidan | B60J 5/0416 |
| | | | 292/336.3 |
| 8,870,247 B2 * | 10/2014 | Yamagata | E05B 77/34 |
| | | | 292/201 |

(Continued)

FOREIGN PATENT DOCUMENTS

| | | |
|---|---|---|
| JP | H 06255449 A | 9/1994 |
| JP | 2008303700 A | 12/2008 |

OTHER PUBLICATIONS

*Protect Your Car With Your Phone*, retrieved from https://lblue.eu/immobilizer/ on Nov. 22, 2017, 5 pages.

(Continued)

*Primary Examiner* — Ali Neyzari

(74) *Attorney, Agent, or Firm* — James P. Muraff; Neal, Gerber & Eisenberg LLP

(57) ABSTRACT

Methods and apparatus are disclosed to facilitate vehicle locking. An example vehicle comprises an engine, wheels, a door, a door lock, a torque lock, and a processor and memory. The torque lock is to disable torque transfer from the engine to the wheels. The door lock is to secure the door. The processor and memory are in communication with the torque lock and the door lock and configured to: engage the torque and door locks based on receipt of at least one lockout code and, if received authentication information matches the at least one lockout code, disengage the torque and door locks.

20 Claims, 4 Drawing Sheets

(56) References Cited

U.S. PATENT DOCUMENTS

2006/0186987 A1    8/2006   Wilkins
2008/0143139 A1*   6/2008   Bauer .................... E05C 17/00
                                                                             296/146.1
2013/0033369 A1    2/2013   Burnett

OTHER PUBLICATIONS

Mike Szczys, *Car Computer Requires Pin for Ignition*, retrieved from https://hackaday.com/2010/09/02/car-computer-requires-pin-for-ignition/ on Nov. 2, 2017, 4 pages.

\* cited by examiner

US 10,155,499 B1

METHODS AND APPARATUS TO FACILITATE VEHICLE LOCKING

TECHNICAL FIELD

The present disclosure generally relates to vehicle security features and, more specifically, methods and apparatus to facilitate vehicle locking.

BACKGROUND

In recent years, vehicles have been equipped with vehicle security features such as door locks, exterior keypads, etc. Vehicle security features help to secure the vehicle from entry and/or use by unauthorized parties. Vehicle security features are often engaged and disengaged using a key or a code.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example vehicle is disclosed. The vehicle comprises an engine, wheels, a door, a door lock, a torque lock, and a processor and memory. The torque lock is to disable torque transfer from the engine to the wheels. The door lock is to secure the door. The processor and memory are in communication with the torque lock and the door lock and configured to: engage the torque and door locks based on receipt of at least one lockout code and, if received authentication information matches the at least one lockout code, disengage the torque and door locks.

An example method is disclosed. The method comprises: responsive to receipt of at least one lockout code, engaging, with a processor, a torque lock to disable torque transfer from an engine to wheels and a door lock to secure a door; determining, with the processor, whether received authentication information matches the at least one lockout code; and if the authentication information matches the at least one lockout code, disengaging, with the processor, the torque and door locks.

An example system is disclosed. The system comprises a mobile device, a central facility, a dedicated short range communication (DSRC) transceiver, a torque lock, a door lock, and a processor. The mobile device is to receive at least one driver-entered lockout code and authentication information. The central facility is in communication with the mobile device and has a database to store the at least one lockout code. The DSRC transceiver is disposed in a vehicle and in communication with the database and the mobile device. The torque lock is disposed in the vehicle to disable torque transfer from an engine of the vehicle to wheels of the vehicle. The door lock is disposed in the vehicle to secure a door of the vehicle. The processor is in communication with the DSRC transceiver, the door lock, and the torque lock and is configured to: receive the at least one lockout code; engage the torque lock and the door lock in response to the at least one lockout code; receive the authentication information; determine whether the authentication information matches the at least one lockout code; and if the authentication information matches the at least one lockout code, disengage the torque lock and the door lock.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
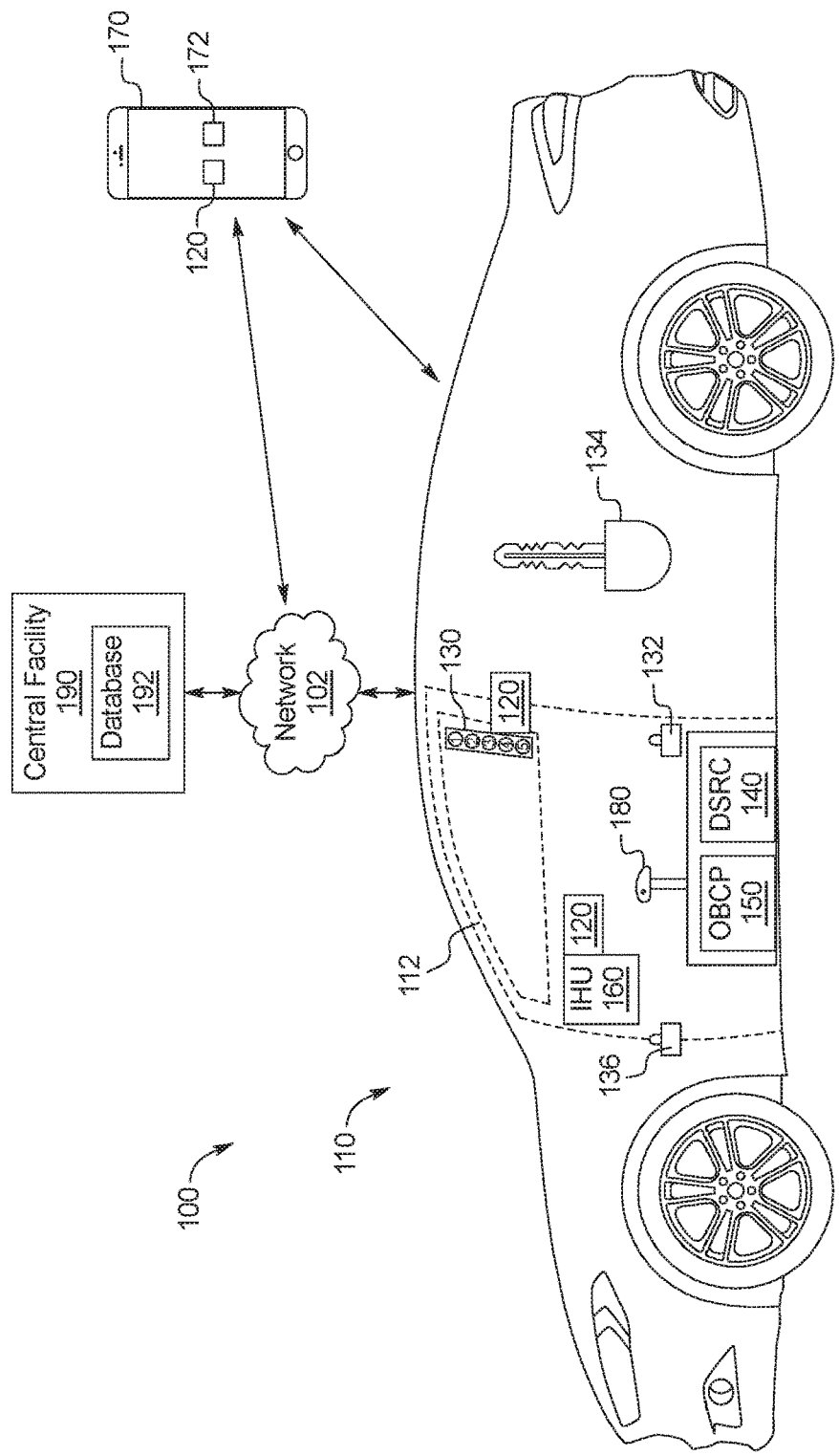
FIG. 1 illustrates a vehicle operating in accordance with the teachings of this disclosure in an environment.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicle security features include door locks and ignition locks, among others. The door locks secure the interior of the vehicle from unauthorized entry. The ignition locks secure the ignition of the vehicle from unauthorized starting.

Traditionally, a key is used to engage and disengage the door locks and the ignition lock. In some instances, the door locks may be engaged and disengaged using a keypad on the exterior of the vehicle. In these instances, the keys to the vehicle may be locked inside the vehicle. However, if an unauthorized party gained access to the interior of the vehicle (e.g., by breaking a window), the unauthorized party would have the key to start the vehicle.

This disclosure provides methods and apparatus to facilitate vehicle locking. In some examples, the vehicle may be put into a lockout mode where the doors and the torque delivery system (e.g., the ignition, powertrain, transmission, etc.) are locked with one or more lockout codes entered by a driver via a mobile device, an infotainment head unit (IHU), and/or an exterior keypad and stored in a memory. A driver may exit the lockout mode by reentering the lockout code via the mobile device, the IHU, and/or the exterior keypad. By requiring codes to disengage the lockout mode, drivers may confidently lock keys, mobile devices, and other belongings in the vehicle. Thus, even if the vehicle is entered by an unauthorized party, the vehicle will not move because the torque delivery system is disabled despite a key being available to the unauthorized party.

Figure 2:
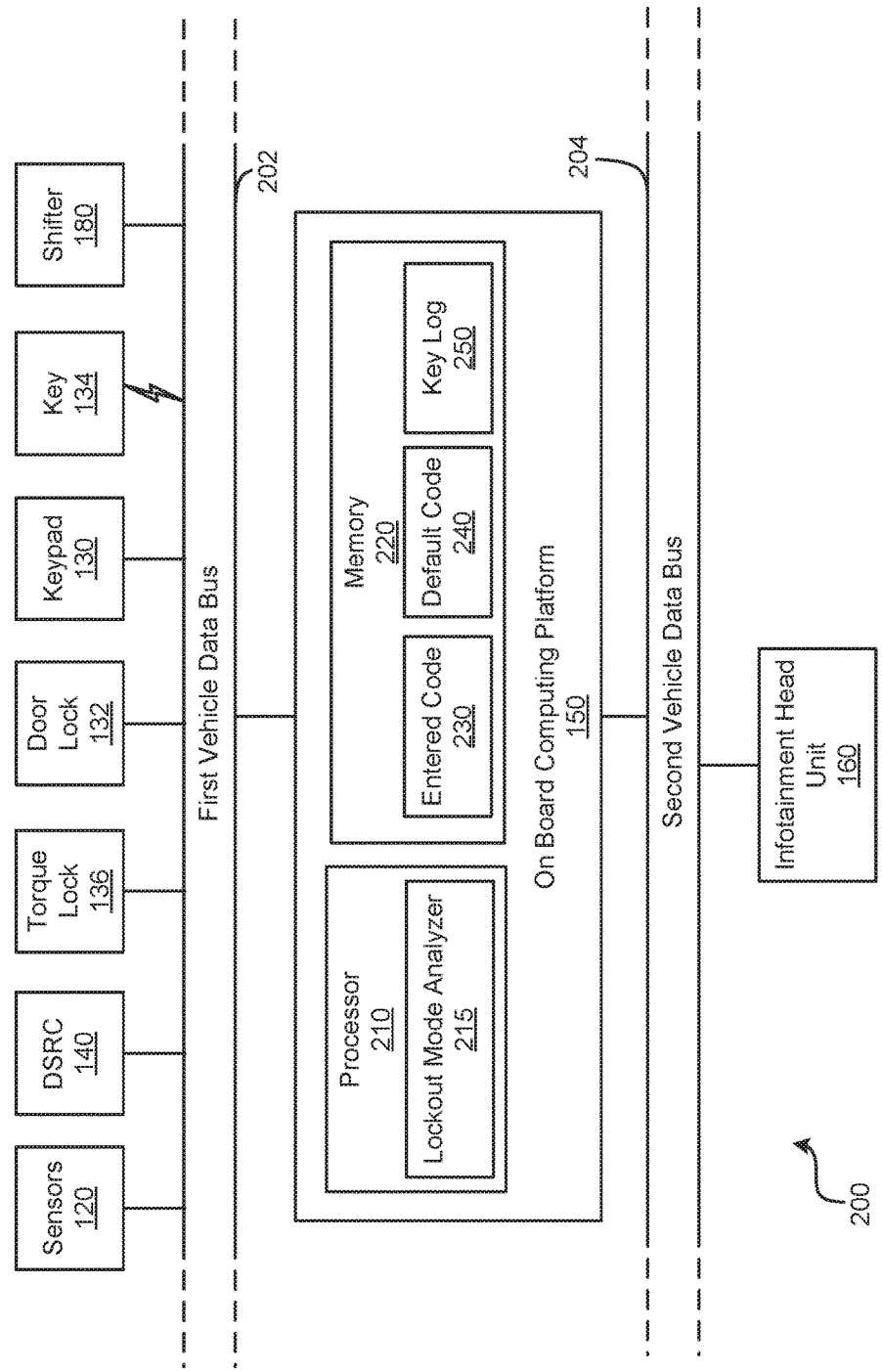
FIG. 2 is a block diagram of the electronic components of the vehicle of FIG. 1.
Figure 3:
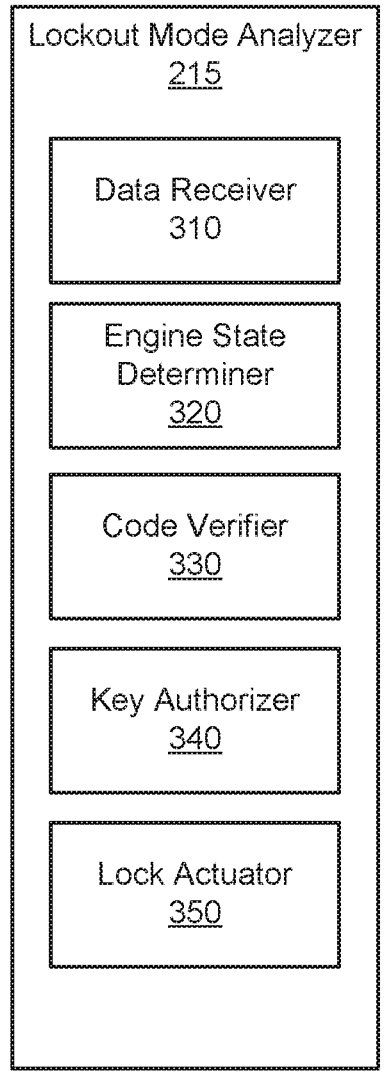
FIG. 3 is a more detailed block diagram of the lockout mode analyzer of FIG. 2.

FIG. 1 illustrates a vehicle 110 operating in accordance with the teachings of this disclosure in an environment 100. FIG. 2 is a block diagram of the electronic components 200 of the vehicle 110. FIG. 3 is a more detailed block diagram of a lockout mode analyzer 215 of the vehicle 110.

Referring to FIG. 1, the environment 100 includes, a network 102, the vehicle 110, a central facility 190, and a mobile device 170 of a driver or a remote third party. The central facility 190 includes a database 192 that stores driver-entered and/or default lockout codes. Lockout codes will be explained in greater detail below in conjunction with FIGS. 2 and 3.

The vehicle 110 may be a standard gasoline powered vehicle, a hybrid vehicle, an electric vehicle, a fuel cell vehicle, and/or any other mobility implement type of vehicle. The vehicle 110 includes parts related to mobility, such as a powertrain with an engine, a transmission, a suspension, a driveshaft, and/or wheels, etc. The vehicle 110 may be non-autonomous, semi-autonomous (e.g., some routine motive functions controlled by the vehicle 110), or autonomous (e.g., motive functions are controlled by the vehicle 110 without direct driver input). As shown in FIG. 1, the vehicle 110 includes a door 112, sensors 120, an exterior keypad 130, a door lock 132, a torque lock 136, a dedicated short range communication (DSRC) transceiver 140, an on-board computing platform (OBCP) 150, an infotainment head unit (IHU) 160, and a shifter 180. The vehicle 110 is associated with a key 134. The key 134 includes an authorization code to start the vehicle 110. The key 134 may be a transceiver-equipped key (e.g., MyKey). The vehicle 110 may have a push-button start that communicates wirelessly with the key 134 to start the vehicle 110. As used herein, the term "engine" includes any device that provides motive power such as, but not limited to, an internal combustion engine, an electric motor, an external combustion engine, a turbine, etc.

The vehicle 110 is in communication with the central facility 190 and the mobile device 170 via the DSRC transceiver 140 and the network 102. In some instances, the vehicle 110 is in communication with the mobile device 170 directly via the DSRC transceiver 140.

The sensors 120 may be arranged in and around the vehicle 110 in any suitable fashion. The sensors 120 may be mounted to measure properties around the exterior of the vehicle 110. Additionally, some sensors 120 may be mounted inside the cabin of the vehicle 110 or in the body of the vehicle 110 (such as, the engine compartment, the wheel wells, etc.) to measure properties in the interior of the vehicle 110. Further, the mobile device 170 may include sensors 120. For example, such sensors 120 may include accelerometers, odometers, tachometers, pitch and yaw sensors, wheel speed sensors, microphones, tire pressure sensors, and biometric sensors, etc.

In the illustrated examples of FIGS. 1 and 2, the sensors 120 include biometric sensors such as a fingerprint reader, a retina scanner, microphone, etc. In some examples, the sensors 120 measure biometric attributes (e.g., fingerprints, retinas, voices, etc.) of authorized drivers of the vehicle 110 to engage and disengage a lockout mode in the vehicle 110. In other words, the sensors 120 measure biometric attributes that are processed into biometric signatures when the vehicle 110 enters the lockout mode, as will be described in greater detail below. The sensors 120 further measure biometric attributes of drivers attempting to release the vehicle from the lockout mode. Further, the sensors 120 include powertrain sensors that generate engine run state information (e.g., whether the engine of the vehicle 110 is on or off.).

The exterior keypad 130 includes a plurality of alphabetic and/or numeric keys (e.g., A, B, C, D, E; 1, 2, 3, 4, 5; etc.). In some examples, the exterior keypad 130 is mounted on the door 112. Lockout codes 230, 240 may be entered into the OBCP 150 via the exterior keypad 130 to engage and disengage the door and torque locks 132, 136. In some examples, the exterior keypad 130 is associated with a sensor 120.

In operation, the door lock 132 secures the door 112 of the vehicle 110. More specifically, when the door lock 132 is engaged, the door 112 of the vehicle 110 is locked to prevent unauthorized entry of the vehicle 110. It should be understood that the vehicle 110 may have multiple doors 112 and that, in some examples, the door lock 132 secures all the doors 112 simultaneously. Further, in some examples, the door lock 132 may be selectively disengaged to unlock one door 112 while leaving other doors 112 locked. For example, when exiting the lockout mode, the door lock 132 may unlock the front driver's side door 112 while leaving the rear driver's side and passengers' side doors and trunk locked. The door lock 132 may be engaged and disengaged via the exterior keypad 130, lock buttons inside the vehicle 110, the IHU 160, and/or the mobile device 170.

In operation, the torque lock 136 secures (e.g., enables and disables) torque transfer from an engine of the vehicle 110 to wheels of the vehicle 110. More specifically, the torque lock 136 functions as an ignition lock to prevent engine starting and/or as a transmission lock to prevent the transmission from transferring torque from the engine to the wheels (e.g., locking the shifter 180 in Park, keeping the shifter 180 in Neutral, etc.) When the engine is not running (e.g., off), the torque lock 136 prevents the engine from starting while the vehicle lockout mode is engaged. Thus, with the engine prevented from starting, no torque is available to be delivered to the wheels. When the engine is running (e.g., on) and the vehicle lockout mode is engaged, the torque lock 136 prevents the shifter 180 from engaging a transmission of the vehicle 110 to transfer torque from the engine to wheels of the vehicle (e.g., moving from Park to Drive, moving from neutral to first gear, etc.). Thus, with the transmission prevented from entering a drive mode (e.g., Drive, first gear, reverse, etc.), no torque can be delivered to the wheels. Thus, the vehicle 110 may be left running yet prevented from moving while in the lockout mode to provide lighting, electrical power, etc. The torque lock 136 may be engaged and disengaged via the exterior keypad 130, the IHU 160, and/or the mobile device 170. For example, engage the torque lock 136 may be engaged when the key 134 is within the vehicle 110 and the vehicle 110 is locked via the exterior keypad 130. In some examples, the torque lock 136 includes one or more physical locks connected the engine and/or the transmission. In some examples, the torque lock 136 is an electronic component that controls starting of the engine and/or shifting of the transmission.

The example DSRC transceiver 140 includes antenna(s), radio(s), cellular modem(s), and software to broadcast messages and to establish connections between the vehicle 110 and other vehicles, infrastructure-based modules (e.g., the central facility 190), and mobile device-based modules, (e.g., the mobile device 170). The mobile device-based modules are included in mobile devices such as cellular telephones, smartphones, tablets, etc. In some examples, the vehicle 110 receives driver-entered lockout codes (including biometric signatures) from the mobile device 170 via the DSRC transceiver 140. In some examples, the vehicle 110 receives the biometric signatures from the central facility 190 via the DSRC transceiver 140. More information on the DSRC network and how the network may communicate with vehicle hardware and software is available in the U.S. Department of Transportation's Core June 2011 System Requirements Specification (SyRS) report (available at http://www its.dot.gov/meetings/pdf/CoreSystem_SE_

SyRS_RevA %20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as GPS, Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like (e.g., V2X, etc.). Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

The OBCP 150 controls various subsystems of the vehicle 110. In some examples, the OBCP 150 controls power windows, power locks, an immobilizer system, and/or power mirrors, etc. In some examples, the OBCP 150 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. In some examples, the OBCP 150 processes information from the sensors 120, the exterior keypad 130, the mobile device 170, and/or the IHU 160 to execute and support the vehicle lockout mode. Using the lockout codes 230, 240 provided via the sensors 120, the exterior keypad 130, the mobile device 170, and/or the IHU 160, the OBCP 150 determines whether to lock or unlock the door and torque locks 132, 136, as will be explained in greater detail below.

The infotainment head unit 160 provides an interface between the vehicle 110 and a user. The infotainment head unit 160 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers.

In the illustrated examples of FIGS. 1 and 2, the infotainment head unit 160 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 160 displays the infotainment system on, for example, the center console display. Lockout codes 230, 240 may be entered into the OBCP 150 via the IHU 160 to engage and disengage the door and torque locks 132, 136. Further, in some examples, the IHU 160 is associated with one or more biometric sensors 120.

The mobile device 170 includes a sensor 120 and a processor 172. The mobile device 170 may be, for example, a cellular telephone, a tablet, a laptop computer, etc. The processor 172 of the mobile device 170 executes an application (e.g., FordPass, etc.) to provide an interface for communication between the mobile device 170 and the OBCP 150 via the DSRC transceiver 140 and, in some instances the network 102. The application further provides an interface for communication between the mobile device 170 and the central facility 190 via the network 102. The processor 172 further generates biometric signatures based on biometric attributes measured by the sensor 120 of the mobile device 170. For example, the processor 172 converts a fingerprint scan into a fingerprint map, a recording into a voice sample, a retina scan into a retina map, etc. In some examples, the biometric signatures act as driver-entered lockout codes 230. In some examples, the biometric signatures are stored in the database 192. Lockout codes 230, 240 may be entered into the OBCP 150 via the mobile device 170 to engage and disengage the door and torque locks 132, 136.

Referring to FIGS. 1 and 2, the first vehicle data bus 202 communicatively couples the sensors 120, the DSRC transceiver 140, the torque lock 136, the door lock 132, the exterior keypad 130, key 134, the shifter 180, the OBCP 150, and other devices connected to the first vehicle data bus 202. In some examples, the first vehicle data bus 202 is implemented in accordance with the controller area network (CAN) bus protocol as defined by International Standards Organization (ISO) 11898-1. Alternatively, in some examples, the first vehicle data bus 202 may be a Media Oriented Systems Transport (MOST) bus, or a CAN flexible data (CAN-FD) bus (ISO 11898-7). The second vehicle data bus 202 communicatively couples the OBCP 150 and the infotainment head unit 160. The second vehicle data bus 204 may be a MOST bus, a CAN-FD bus, or an Ethernet bus. In some examples, the OBCP 150 communicatively isolates the first vehicle data bus 202 and the second vehicle data bus 204 (e.g., via firewalls, message brokers, etc.). Alternatively, in some examples, the first vehicle data bus 202 and the second vehicle data bus 204 are the same data bus.

The OBCP 150 includes a processor or controller 210 and memory 220. In the illustrated example, the OBCP 150 is structured to include a lockout mode analyzer 215. Alternatively, in some examples, the lockout mode analyzer 215 may be incorporated into another electronic control unit (ECU) with its own processor 210 and memory 220. In operation, the lockout mode analyzer 215 engages and determines whether to disengage the lockout mode based on engine run state information from the sensors 120 and authorization information from the exterior keypad 130, the key 134, the DSRC transceiver 140, and the IHU 160. In some examples, the processor 210 generates biometric signatures based on biometric attributes measured by the sensors 120 of the vehicle 110. For example, the processor 210 converts a fingerprint scan into a fingerprint map, a recording into a voice sample, a retina scan into a retina map, etc. In such examples, the processor 210 stores the biometric signatures as driver-entered lockout codes 230 in the memory 220.

Referring to FIGS. 1 and 2, the processor or controller 172, 210 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 220 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 220 includes multiple kinds of memory, particularly volatile memory and non-volatile memory.

The memory 220 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 220, the computer readable medium, and/or within the processor 210 during execution of the instructions. The memory 220 stores one or more driver-entered lockout codes 230 and one or more default codes 240. The default codes 240 may be used to disengage the lockout mode in the event a driver forgets or otherwise loses the driver-entered codes 230. The memory 220 may be programmed with the default codes 240 during production of the vehicle 110. The driver-entered lockout codes 230 may, for example, be numeric, alphanumeric, a biometric signature, etc. The default codes 240 may be, for example, numeric, alphanumeric, etc. The memory 220 further stores a log 250 of keys authorized to start the engine (e.g., the key 134). In some examples, communications between the key 134 and the processor 210 are encrypted. In some examples, the key 134 and the authorized key log 250 are updated based on an encryption scheme (e.g., rolling codes, an encryption key, etc.).

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

Referring to FIG. 3, the lockout mode analyzer 215 includes a data receiver 310, an engine state determiner 320, a code verifier 330, a key authorizer 340, and a lock actuator 350.

In operation, the data receiver 310 receives driver-entered lockout codes sent by the IHU 160, the sensors 120, the exterior keypad 130, and/or the mobile device 170; engine run state information from the sensors 120; candidate authentication information from the exterior keypad 130, the sensors 120, the IHU 160, and/or the mobile device 170; and key authorization information from the key 134.

Driver-entered lockout codes 230 sent by the mobile device 170 are received at the data receiver 310 via the DSRC transceiver 140. Further, the data receiver 310 stores the driver-entered lockout codes 230 in the memory 220. In some examples, a single driver-entered lockout code 230 may be used to lock and unlock the door and torque locks 132, 136. In some examples, multiple driver-entered lockout codes 230 may be used to lock and unlock the door and torque locks 132, 136. In such examples, a first driver-entered lockout code 230 may lock and unlock the door lock 132 while a second driver-entered lockout code 230 may lock and unlock the torque lock 136.

Authentication information includes candidate unlock request codes and/or candidate biometric scans. In other words, authentication information are one or more sets of entries to the exterior keypad 130, IHU 160, mobile device 170, and/or sensors 120 requesting disengagement of the lockout mode.

In operation, the engine state determiner 320 determines a run state of an engine of the vehicle 110 and/or a run state of the torque delivery system. More specifically, the engine state determiner 320 determines when the engine is on (e.g., running) or off (e.g., not running) based on engine run state information from the sensors 120. When the engine is running, the engine state determiner 320 generates an ON run status. When the engine is not running, the engine state determiner 320 generates an OFF run status. Further, the engine state determiner 320 detects torque delivery requests such as, for example, whether the shifter 180 has been moved, the key 134 has been turned in an ignition key cylinder, an ignition pushbutton has been pushed, etc.

In operation, the code verifier 330 verifies whether candidate authentication information entered to release the lockout mode matches a stored lockout code 230, 240. More specifically, the code verifier 330 determines whether a candidate code and/or biometric scan entered via the exterior keypad 130, sensors 120, the IHU 160, and/or the mobile device 170 matches the driver-entered lockout code 230 or the default lockout code 240. In other words, the code verifier 330 compares candidate unlock request authentication information to the stored lockout codes 230, 240. In some examples, the code verifier 330 retrieves the stored lockout code 230, 240 from the memory 220. In some examples, the code verifier 330 retrieves the stored lockout code 230, 240 from the database 192 via the DSRC transceiver 140. If the candidate authentication information matches the stored lockout codes 230, 240, the code verifier 330 generates unlock requests for the door lock 132 and/or the torque lock 136.

In operation, the key authorizer 340 determines whether a candidate key 134 is present and authorized to start the engine of the vehicle 110. More specifically, the key authorizer 340 compares the key authorization information from the key 134 to the log of authorized keys 250. If the key authorization information matches the log of authorized keys 250, the key authorizer 340 generates an engine start request for the engine of the vehicle 110.

In operation, the lock actuator 350 locks and unlocks the door and torque locks 132, 136. More specifically, the lock actuator 350 locks the door and torque locks 132, 136 based on a driver-entered lockout code to enter the lockout mode received via the data receiver 310 and an engine run status generated by the engine state determiner 320. The lock actuator 350 locks the torque lock 136 to disable the engine or the shifter 180 in response to an OFF run status. The lock actuator 350 locks the torque lock 136 to disable the transmission in response to an ON run status. Further, when the lock actuator 350 receives the unlock request(s) from the code verifier 330, the lock actuator 350 unlocks the door lock 132 and/or the torque lock 136 as requested by the code verifier 330. In other words, the lock actuator 350 locks the vehicle 110 when a driver-entered lockout code 230 is entered to engage the lockout mode and unlocks the door lock 132 and/or the torque lock 136 when authentication information entered to disengage the lockout mode is verified. In some examples, the lock actuator 350 determines whether a torque delivery request (e.g., moving the shifter 180, an engine start attempt, etc.) was made before expiration of a timeout threshold (e.g., 30 seconds, 60 seconds, etc.) after the torque lock 136 is released.

Figure 4:
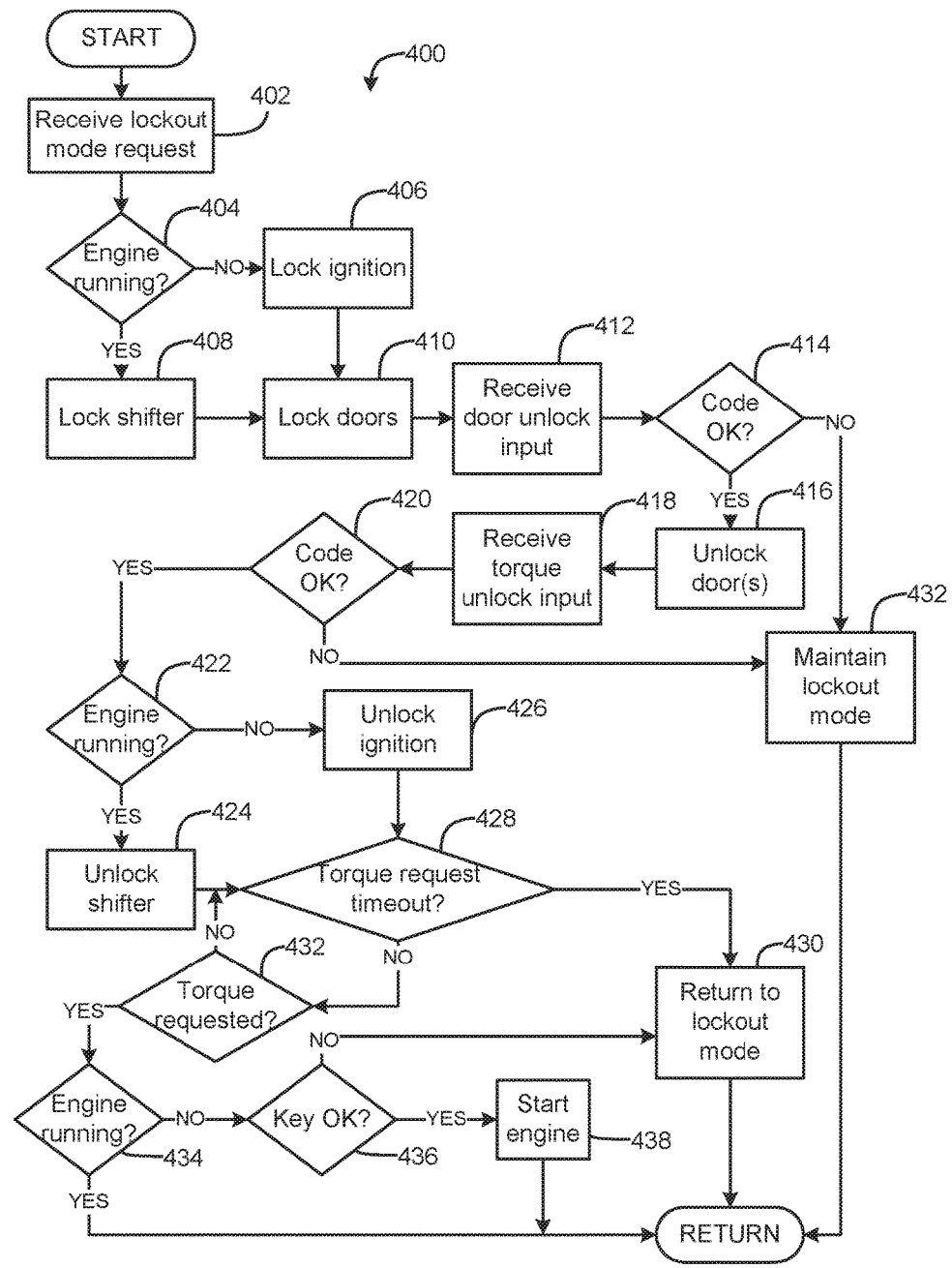
FIG. 4 is a flowchart of a method to engage and disengage a lockout mode in of the vehicle of FIG. 1, which may be implemented by the electronic components of FIG. 2.

FIG. 4 is a flowchart of a method 400 to engage and disengage a lockout mode in of the vehicle of FIG. 1, which may be implemented by the electronic components 200 of FIG. 2. The flowchart of FIG. 4 is representative of machine readable instructions stored in memory (such as the memory 220 of FIG. 2) that comprise one or more programs that, when executed by a processor (such as the processor 210 of FIG. 2), cause the vehicle 110 to implement the example lockout mode analyzer 215 of FIGS. 2 and 3. Further, although the example program(s) is/are described with reference to the flowchart illustrated in FIG. 2, many other methods of implementing the example lockout mode analyzer 215 may alternatively be used. For example, the order of execution of the blocks may be changed, and/or some of the blocks described may be changed, eliminated, or combined.

Initially, at block 402, the data receiver 310 receives lockout code(s) 230 submitted by a driver of the vehicle 110 via the exterior keypad 130, the sensors 120, the IHU 160, or the mobile device 170. By entering a lockout code(s) 230, the driver requests engagement of the lockout mode. As discussed above driver-entered lockout code(s) 230 may be a numeric code, an alphanumeric code, and/or a biometric signature and are stored in the memory 220 and, in some instances, in the database 192. Additionally, as discussed above, a driver may enter a first lockout code 230 to lock the torque lock 136 and a second lockout code 230 to lock door lock 132. Further, the data receiver 310 is in communication with the IHU 160, the exterior keypad 130, the sensors 120, and the mobile device 170 via the first vehicle data bus 202 and/or the second vehicle data bus 204.

At block 404, engine state determiner 320 determines whether the engine of the vehicle 110 is running based on engine state information received from the sensors 120 via the data receiver 310.

If, at block 404, the engine state determiner 320 determines that the engine is not running, the method proceeds to block 406.

At block 406, the lock actuator 350 actuates the torque lock 136 to disable starting of the engine. Thus, as discussed above, the vehicle 110 may not be started to move or to provide lighting and/or electrical power. The method 400 proceeds to block 410.

If, at block 404, the engine state determiner 320 determines that the engine is running, the method proceeds to block 408.

At block 408, the lock actuator 350 actuates the torque lock 136 to lock the transmission of the vehicle 110. Thus, as discussed above, the vehicle 110 remains running to provide lighting and/or electrical power, but is disabled from moving. The method 400 proceeds to block 410.

At block 410, the lock actuator 350 actuates the door lock 132 to secure the doors 112 of the vehicle 110. Thus, by executing block 410 in conjunction with block 406 or block 408, the lockout mode of the vehicle 110 is engaged. The driver of vehicle 110 may thus securely leave the key 134 locked in the vehicle 110. In some instances, the driver may inform an authorized party (e.g., a family member, a friend, a colleague, etc.) of the lockout code 230 for the authorized party to retrieve the vehicle 110 from a specified location (e.g., an airport parking lot, a fleet vehicle parking structure, etc.). Thus, even if the vehicle 110 is entered without authorization, the vehicle 110 cannot be moved despite the key 134 being present in the vehicle 110. In some instances, such as a trip to the beach or a pool, the driver may leave the key 134, the mobile device 170, and other valuables in the vehicle 110 while the vehicle 110 is in lockout mode. Thus, the key 134, the mobile device 170, and other valuables are substantially secured from damage and/or accidental loss. In some instances, the driver may activate the lockout mode remotely via the mobile device 170 and the network 102. The method 400 proceeds to block 412.

At block 412, the data receiver 310 receives first candidate authentication information from a candidate driver of the vehicle 110 via the exterior keypad 130, the sensors 120, the IHU 160, or the mobile device 170. By entering first candidate authentication information, the candidate driver requests disengagement of the lockout mode to unlock the door lock 132. In instances where the mobile device 170 has been locked in the vehicle 110, the candidate authentication information is entered via the exterior keypad 130 and/or sensors 120. The method 400 proceeds to block 414.

At block 414, the code verifier 330 determines whether the first candidate authentication information matches the stored driver-entered lockout code 230 to unlock the doors 112 or, in the event that the candidate driver has forgotten the driver-entered lockout code 230, the default lockout code 240 to unlock the doors 112. As discussed above, the code verifier 330 accesses the memory 220 to compare the candidate authentication information to the stored lockout codes 230, 240.

If, at block 414, the code verifier 330 determines that the first candidate authentication information does not match the stored lockout code 230, 240, the method 400 proceeds to block 432.

At block 432, the code verifier 330 rejects the first candidate authentication information and the lock actuator 350 maintains the lockout mode. The method 400 returns to block 402.

If, at block 414, the code verifier 330 determines that the first candidate authentication information matches the stored lockout code 230, 240, the method 400 proceeds to block 416.

At block 416, the lock actuator 350 actuates the door lock 132 to unlock one or more of the doors 112. The method 400 proceeds to block 418.

At block 418, the data receiver 310 receives second candidate authentication information from the candidate driver via the sensors 120, the IHU 160, or the mobile device 170. By entering second candidate authentication information, the candidate driver requests disengagement of the lockout mode to unlock the torque lock 136. The method 400 proceeds to block 420.

At block 420, the code verifier 330 determines whether the second candidate authentication information matches the stored driver-entered lockout code 230 to release torque transfer or, in the event that the candidate driver has forgotten the driver-entered lockout code 230, the default lockout code 240 to release torque transfer.

If, at block 420, the code verifier 330 determines that the second candidate authentication information does not match the stored lockout code 230, 240, the method 400 proceeds to block 432, discussed above.

If, at block 420, the code verifier 330 determines that the second candidate authentication information matches the stored lockout code 230, 240, the method 400 proceeds to block 422.

At block 422, the engine state determiner 320 determines whether the engine is running. As discussed above, the engine state determiner 320 determines a run status based on engine run state information from the sensors 120.

If, at block 422, the engine state determiner 320 determines that the engine is not running, the method proceeds to block 426.

At block 426, the lock actuator 350 actuates the torque lock 136 to release the engine of the vehicle 110. The method 400 proceeds to block 428.

If, at block 422, the engine state determiner 320 determines that the engine is running, the method proceeds to block 424.

At block 424, the lock actuator 350 actuates the torque lock 136 to release the transmission of the vehicle 110. The method 400 returns to block 402.

It should be understood that, in examples where a single driver-entered lockout code 230 or default code 240 is used to lock and unlock and the door and torque locks 132, 136, the first and second candidate authentication information entered respectively at block 412 and block 418 is the same. In other words, in such examples, the first candidate authentication information submitted at block 412 may release both the door and torque locks 132, 136.

At block 428, the lock actuator 350 determines whether a threshold timeout time has elapsed since the torque lock 136 was released at block 426 or block 424.

If, at block 428, the threshold timeout time has elapsed, the method 400 proceeds to block 430.

At block 430, the lock actuator 350 returns the vehicle 110 to the previous lockout mode. More specifically, the lock actuator 350 locks the door lock 132 to secure the doors 112 and the torque lock 136 to disable the torque delivery system. The method 400 returns to block 402.

If, at block 428, the threshold timeout time has not elapsed, the method 400 proceeds to block 432.

At block 432, the engine state determiner 320 determines whether the torque delivery system of the vehicle 110 has been actuated to attempt to move the vehicle 110. As discussed above, the engine state determiner 320 detects, for example, whether the shifter 180 has been moved, the key 134 has been turned in a key cylinder, an ignition pushbutton has been pushed, etc.

If, at block 432, the engine state determiner 320 determines than the torque delivery system of the vehicle 110 has not been actuated, the method 400 returns to block 428. Thus, between blocks 428 and 430, lock actuator 350 and the engine state determiner 320 wait for the threshold timeout time to elapse before returning the vehicle 110 to the lockout mode.

If, at block 432, the engine state determiner 320 determines than the torque delivery system of the vehicle 110 has been actuated, the method 400 proceeds to block 434.

At block 434, the engine state determiner 320 determines whether the engine of the vehicle 110 is running based on engine state information received from the sensors 120 via the data receiver 310.

If, at block 434, the engine state determiner 320 determines that the engine is running, the method returns to block 402.

If, at block 434, the engine state determiner 320 determines that the engine is not running, the method proceeds to block 436.

At block 436, the key authorizer 340 determines whether a key (e.g., the key 134) is present in the vehicle 110 and authorized to start the engine. As discussed above, the key authorizer 340 determines whether a key authorization code provided by the key 134 is present in the log of authorized keys 250.

If, at block 436, the key authorizer 340 determines that the key 134 is not present or authorized to start the engine, the method 400 proceeds to block 430.

If, at block 436, the key authorizer 340 determines that the key 134 is present and authorized to start the engine, the method 400 proceeds to block 438.

At block 438, the key authorizer 340 starts the engine of the vehicle 110. The method 400 returns to block 402.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

From the foregoing, it should be appreciated that the above disclosed apparatus and methods may aid drivers in securing vehicles and valuables in the vehicles. By placing a vehicle in a lockout mode that both secures the doors of the vehicle and disables torque transfer from the powertrain to the wheels, drivers may confidently leave keys and other valuables locked in the vehicle. Further, by disabling torque transfer, the vehicle may be securely left running with the key in the vehicle to provide lighting and/or electrical power (e.g., at a worksite, on a camping trip, etc.). It should also be appreciated that the disclosed apparatus and methods provide a specific solution—locking torque transfer of a vehicle—to a specific problem—vulnerability of unauthorized entry to a vehicle in which a key is locked. Further, the disclosed apparatus and methods provide an improvement to computer-related technology by increasing functionality of a processor to lock and release torque transfer from an engine to the wheels of a vehicle with a driver-entered lockout code.

As used here, the terms "module" and "unit" refer to hardware with circuitry to provide communication, control and/or monitoring capabilities, often in conjunction with sensors. "Modules" and "units" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a torque lock to disable torque transfer from an engine to wheels;
   a door lock to secure a door; and
   a processor and memory in communication with the torque and door locks and configured to:
   engage the torque and door locks based on receipt of at least one lockout code; and
   if received authentication information matches the at least one lockout code, disengage the torque and door locks.

2. The vehicle of claim 1, further comprising at least one of an infotainment head unit (IHU), a mobile device, an exterior keypad, and a sensor wherein:
the processor is in communication with the at least one of the IHU, the mobile device, the exterior keypad, and the sensor; and
the at least one lockout code is submitted to the processor via the at least one of the IHU, the mobile device, the exterior keypad, and the sensor.

3. The vehicle of claim 2, wherein:
the sensor measures biometric attributes;
the processor is configured generate a biometric signature based on the biometric attributes; and
the at least one lockout code includes the biometric signature.

4. The vehicle of claim 3, wherein the biometric signature includes at least one of a fingerprint map, a voice sample, or a retina map.

5. The vehicle of claim 2, wherein the authentication information is submitted to the processor via the at least one of the IHU, the mobile device, the exterior keypad, and the sensor.

6. The vehicle of claim 1, further comprising:
a shifter; and
a sensor to generate engine run state information;
wherein the processor is in communication with the shifter and the sensor and is further configured to:
determine whether the engine is running based on the engine run state information;
if the engine is running, lock the shifter with the torque lock; and
if the engine is not running, disable the engine with the torque lock.

7. The vehicle of claim 1, wherein:
the at least one lockout code is a first lockout code and a second lockout code;
the received authentication information is a first unlock request and a second unlock request; and
the processor is configured to:
engage the torque lock in response to the first lockout code;
engage the door lock in response to the second lockout code;
if the first unlock request matches the first lockout code, disengage the torque lock; and
if the second unlock request matches the second lockout code, disengage the door lock.

8. The vehicle of claim 1, wherein the processor is configured to:
detect a torque request; and
if no torque request is detected after expiration of a timeout threshold, re-engage the torque and door locks.

9. A method comprising:
responsive to receipt of at least one lockout code, engaging, with a processor, a torque lock to disable torque transfer from an engine to wheels and a door lock to secure a door;
determining, with the processor, whether received authentication information matches the at least one lockout code; and
if the authentication information matches the at least one lockout code, disengaging, with the processor, the torque and door locks.

10. The method of claim 9, further comprising submitting the at least one lockout code to the processor via at least one of an infotainment head unit (IHU), a mobile device, an exterior keypad, or a sensor.

11. The method of claim 10, further comprising:
measuring, with the sensor, biometric attributes; and
generating, with the processor, a biometric signature, wherein the at least one lockout code includes the biometric signature.

12. The method of claim 10, wherein the biometric signature includes at least one of a fingerprint map, a voice sample, or a retina map.

13. The method of claim 9, further comprising submitting the authentication information to the processor via at least one of an infotainment head unit (IHU), a mobile device, an exterior keypad, or a sensor.

14. The method of claim 13, further comprising
generating, with the sensor, engine run state information;
determining, with the processor, whether the engine is running based on the engine run state information;
wherein engaging the torque lock includes:
if the engine is running, locking a shifter with the torque lock; and
if the engine is not running, disabling the engine with the torque lock.

15. The method of claim 9, wherein:
the at least one lockout code is a first lockout code and a second lockout code; and
the authentication information is a first unlock request and a second unlock request;
engaging the torque lock and the door lock includes:
engaging the torque lock in response to the first lockout code; and
engaging the door lock in response to the second lockout code; and
disengaging the torque lock and the door lock includes:
if the first unlock request matches the first lockout code, disengaging the torque lock; and
if the second unlock request matches the second lockout code, disengaging the door lock.

16. A system comprising:
a mobile device to receive at least one driver-entered lockout code and authentication information;
a central facility in communication with the mobile device and having a database to store the at least one lockout code;
a dedicated short range communication (DSRC) transceiver disposed in a vehicle and in communication with the database and the mobile device;
a torque lock disposed in the vehicle to disable torque transfer from an engine of the vehicle to wheels of the vehicle;
a door lock disposed in the vehicle to secure a door of the vehicle; and
a processor in communication with the DSRC transceiver, the torque lock, and the door lock and configured to:
receive the at least one lockout code;
engage the torque lock and the door lock in response to the at least one lockout code;
receive the authentication information;
determine whether the authentication information matches the at least one lockout code; and
if the authentication information matches the at least one lockout code, disengage the torque lock and the door lock.

17. The system of claim 16, further comprising:
a shifter disposed in the vehicle to selectively drivably connect the engine to the wheels; and
a sensor disposed in the vehicle to generate engine run state information;

wherein the processor is in communication with the shifter and the sensor is further configured to:
  determine whether the engine is running based on the engine run state information;
  if the engine is running, lock the shifter with torque lock; and
  if the engine is not running, disable the engine with the torque lock.

18. The system of claim 16, wherein:
the mobile device includes a sensor;
the sensor measures biometric attributes;
the mobile device is configured to generate a biometric signature based on the biometric attributes; and
the lockout code includes the biometric signature.

19. The system of claim 18, wherein the biometric signature includes at least one of a fingerprint map, a voice sample, or a retina map.

20. The system of claim 16, wherein:
the at least one lockout code is a first lockout code and a second lockout code;
the authentication information is a first unlock request and a second unlock request; and
the processor is configured to:
  engage the torque lock in response to the first lockout code;
  engage the door lock in response to the second lockout code;
  if the first unlock request matches the first lockout code, disengage the torque lock; and
    if the second unlock request matches the second lockout code, disengage the door lock.

* * * * *